US008484611B2

(12) United States Patent  (10) Patent No.: US 8,484,611 B2
Bouillet et al.  (45) Date of Patent: Jul. 9, 2013

(54) METHOD AND SYSTEM FOR SIMPLIFIED ASSEMBLY OF INFORMATION PROCESSING APPLICATIONS

(75) Inventors: Eric Bouillet, Englewood, NJ (US); Zhen Liu, Tarrytown, NY (US); Anton V. Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1526 days.

(21) Appl. No.: 11/872,385

(22) Filed: Oct. 15, 2007

(65) Prior Publication Data

US 2009/0100407 A1  Apr. 16, 2009

(51) Int. Cl.
*G06F 9/44* (2006.01)

(52) U.S. Cl.
USPC .......................................... 717/105; 717/104

(58) Field of Classification Search
USPC .................................. 717/105, 104
See application file for complete search history.

(56) References Cited

U.S. PATENT DOCUMENTS

| | | | |
|---|---|---|---|
| 4,571,678 A | 2/1986 | Chaitin | |
| 5,159,685 A * | 10/1992 | Kung | 714/26 |
| 5,187,788 A | 2/1993 | Marmelstein | |
| 5,657,428 A * | 8/1997 | Tsuruta et al. | 706/46 |
| 5,659,754 A | 8/1997 | Grove et al. | |
| 5,675,757 A | 10/1997 | Davidson et al. | |
| 5,675,805 A | 10/1997 | Boldo et al. | |
| 5,696,693 A | 12/1997 | Aubel et al. | |
| 5,937,195 A | 8/1999 | Ju et al. | |
| 5,999,729 A | 12/1999 | Tabloski, Jr. et al. | |
| 6,032,142 A | 2/2000 | Wavish | |
| 6,053,951 A | 4/2000 | McDonald et al. | |
| 6,339,783 B1 | 1/2002 | Horikiri | |
| 6,347,320 B1 | 2/2002 | Christensen et al. | |
| 6,430,698 B1 | 8/2002 | Khalil et al. | |
| 6,601,112 B1 | 7/2003 | O'Rourke et al. | |
| 6,665,863 B1 | 12/2003 | Lord et al. | |
| 6,721,747 B2 | 4/2004 | Lipkin | |
| 6,792,595 B1 | 9/2004 | Storistenau et al. | |
| 6,799,184 B2 | 9/2004 | Bhatt et al. | |
| 6,813,587 B2 | 11/2004 | McIntyre et al. | |
| 6,891,471 B2 | 5/2005 | Yuen et al. | |
| 6,983,446 B2 | 1/2006 | Charisius et al. | |
| 7,000,022 B2 * | 2/2006 | Lisitsa et al. | 709/231 |
| 7,062,762 B2 | 6/2006 | Krishnamurthy et al. | |
| 7,103,873 B2 | 9/2006 | Tanner et al. | |
| 7,164,422 B1 | 1/2007 | Wholey, III et al. | |
| 7,174,536 B1 | 2/2007 | Kothari et al. | |
| 7,222,182 B2 * | 5/2007 | Lisitsa et al. | 709/231 |
| 7,231,632 B2 | 6/2007 | Harper | |

(Continued)

OTHER PUBLICATIONS

Altinel et al., "Damia—A Data Mashup Fabric for Internet Applications", Sep. 28, 2007.*

(Continued)

*Primary Examiner* — Phillip H Nguyen
(74) *Attorney, Agent, or Firm* — William J. Stock; F. Chau & Associates, LLC

(57) ABSTRACT

A method for automatic composition of an information processing flow based on a user-specified processing goal, includes: selecting tags from a first plurality of tags, wherein the selected tags specify a processing goal; composing a processing graph in accordance with the processing goal; and displaying a second plurality of tags, wherein the second plurality of tags includes tags that are only relevant to the selected tags.

14 Claims, 11 Drawing Sheets

U.S. PATENT DOCUMENTS

| | | |
|---|---|---|
| 7,263,694 B2 | 8/2007 | Clewis et al. |
| 7,290,244 B2 | 10/2007 | Peck et al. |
| 7,334,216 B2 | 2/2008 | Molina-Moreno et al. |
| 7,409,676 B2 | 8/2008 | Agarwal et al. |
| 7,426,721 B1 | 9/2008 | Saulpaugh et al. |
| 7,466,810 B1 | 12/2008 | Quon et al. |
| 7,472,379 B2 | 12/2008 | Chessell et al. |
| 7,499,906 B2 | 3/2009 | Kloppmann et al. |
| 7,536,676 B2 | 5/2009 | Baker et al. |
| 7,543,284 B2 | 6/2009 | Bolton et al. |
| 7,565,640 B2 | 7/2009 | Shukla et al. |
| 7,614,041 B2 | 11/2009 | Harper |
| 7,627,808 B2 | 12/2009 | Blank et al. |
| 7,639,726 B1 | 12/2009 | Sinsuan et al. |
| 7,657,436 B2 | 2/2010 | Elmore et al. |
| 7,681,177 B2 | 3/2010 | LeTourneau |
| 7,685,566 B2 | 3/2010 | Brown, Jr. et al. |
| 7,716,167 B2 | 5/2010 | Colossi et al. |
| 7,716,199 B2 | 5/2010 | Guha |
| 7,730,467 B1 | 6/2010 | Hejlsberg et al. |
| 7,756,855 B2 | 7/2010 | Ismalon |
| 7,769,747 B2 | 8/2010 | Berg et al. |
| 7,773,877 B2 | 8/2010 | Yang et al. |
| 7,792,836 B2 | 9/2010 | Taswell |
| 7,797,303 B2 | 9/2010 | Roulland et al. |
| 7,809,801 B1 | 10/2010 | Wang et al. |
| 7,810,085 B2 | 10/2010 | Shinnar et al. |
| 7,814,123 B2 | 10/2010 | Nguyen et al. |
| 7,827,210 B2 | 11/2010 | Meliksetian et al. |
| 7,860,863 B2 | 12/2010 | Bar-Or et al. |
| 7,861,151 B2 | 12/2010 | Milic-Frayling et al. |
| 7,877,387 B2 | 1/2011 | Hangartner |
| 7,882,485 B2 | 2/2011 | Feblowitz et al. |
| 7,886,269 B2 | 2/2011 | Williams et al. |
| 7,886,273 B2 | 2/2011 | Hinchey et al. |
| 7,900,201 B1 | 3/2011 | Qureshi et al. |
| 7,954,090 B1 | 5/2011 | Qureshi et al. |
| 7,958,148 B2 | 6/2011 | Barnes et al. |
| 7,982,609 B2 | 7/2011 | Padmanabhan et al. |
| 7,984,417 B2 | 7/2011 | Ben-Zvi et al. |
| 7,984,423 B2 | 7/2011 | Kodosky et al. |
| 7,992,134 B2 | 8/2011 | Hinchey et al. |
| 8,001,527 B1 | 8/2011 | Qureshi et al. |
| 8,032,522 B2 | 10/2011 | Goldstein et al. |
| 8,037,036 B2 | 10/2011 | Blumenau et al. |
| 8,046,737 B2 | 10/2011 | Wittenberg et al. |
| 8,078,487 B2 * | 12/2011 | Li et al. ............ 705/7.22 |
| 8,078,953 B2 | 12/2011 | Kunz et al. |
| 8,086,598 B1 | 12/2011 | Lamb et al. |
| 8,122,006 B2 | 2/2012 | de Castro Alves et al. |
| 2002/0109706 A1 | 8/2002 | Lincke et al. |
| 2004/0015783 A1 | 1/2004 | Lennon et al. |
| 2004/0249664 A1 | 12/2004 | Broverman et al. |
| 2005/0096960 A1 | 5/2005 | Plutowski et al. |
| 2005/0097224 A1 | 5/2005 | Chen et al. |
| 2005/0125738 A1 | 6/2005 | Srivastava et al. |
| 2005/0125739 A1 * | 6/2005 | Thompson et al. ........... 715/778 |
| 2005/0159994 A1 | 7/2005 | Huddleston et al. |
| 2005/0172306 A1 | 8/2005 | Agarwal et al. |
| 2005/0177406 A1 * | 8/2005 | Facciorusso et al. ............ 705/7 |
| 2005/0192870 A1 | 9/2005 | Geddes |
| 2006/0212836 A1 | 9/2006 | Khushraj et al. |
| 2007/0033590 A1 | 2/2007 | Masuouka et al. |
| 2007/0043607 A1 | 2/2007 | Howard et al. |
| 2007/0112777 A1 | 5/2007 | Field et al. |
| 2007/0129953 A1 * | 6/2007 | Cunningham et al. ............ 705/1 |
| 2007/0136281 A1 | 6/2007 | Li et al. |
| 2007/0190499 A1 * | 8/2007 | Baur ............... 434/107 |
| 2007/0204020 A1 | 8/2007 | Anderson et al. |
| 2007/0208685 A1 | 9/2007 | Blumenau |
| 2007/0244912 A1 | 10/2007 | Kawaguchi |
| 2007/0245298 A1 | 10/2007 | Grabarnik et al. |
| 2007/0250331 A1 | 10/2007 | Liu et al. |
| 2007/0282746 A1 | 12/2007 | Anke et al. |
| 2008/0065455 A1 | 3/2008 | Sun et al. |
| 2008/0086485 A1 | 4/2008 | Paper |
| 2008/0140778 A1 | 6/2008 | Banavar et al. |
| 2008/0168529 A1 | 7/2008 | Anderson et al. |
| 2008/0243484 A1 | 10/2008 | Mohri et al. |
| 2009/0070165 A1 | 3/2009 | Baeuerle et al. |
| 2009/0100407 A1 | 4/2009 | Bouillet et al. |
| 2009/0177957 A1 | 7/2009 | Bouillet et al. |
| 2009/0249370 A1 | 10/2009 | Liu et al. |
| 2009/0265718 A1 | 10/2009 | Liu et al. |
| 2010/0293043 A1 | 11/2010 | Atreya et al. |
| 2011/0078285 A1 | 3/2011 | Hawkins et al. |

OTHER PUBLICATIONS

Connor et al, "Key-key value stores for efficiently processing graph data in the cloud", IEEE, pp. 88-93, 2011.

Ma et al., "Mining web graphs for recommendations", IEEE, pp. 1-14, 2011.

Jiang et al., "XML RL update language: syntax and semantics", IEEE, pp. 810-816, 2010.

Comito et al., "Selectively based XML query processing in structured peer to peer networks", ACM Ideas, pp. 236-244, 2010.

Lyritsis et al., "TAGs; Scalable threshold based algorithms for proximity computation in graphs", ACM EDBT, pp. 295-306, 2011.

Riabov et al., "Wishful Search: Interactive Composition of Data Mashups", Google 2008, pp. 775-784.

Habernal et al., "Active Tags for Semantic Analysis", Google 2008, pp. 69-76.

A. Riabov and Z. Liu,; "Scalable Planning for Distributed Stream processing Systems", in ICAPS '06, 2006.

E. Sirin and B. Parsia, "Planning for Semantic Web Services", In Semantic Web Services Workshop at 3rd ISWC, 2004.

K. Whitehouse, F. Zhao and J. Liu, Semantic Streams: a Framework for Composable Semantic Interpretation of Sensor Data, in EWSN '06, 2006.

M. Pistore, P. Traverso, P. Bertoli and A. Marconi, Automated Synthesis of Composite BPEL4WS Web Services., In ICWS, 2005.

Baird, R.; Hepner, M.; Jorgenson, N.; Gamble, R., "Automating Preference and Change in Workflows," Seventh International Conference on Composition-Based Software Systems (Feb. 25-29, 2008), pp. 184-193 [retrieved http://ieeexplore.ieee.org/stamp/stamp.jsp?tp=&arnumber=4464023&isnumber=4463987].

Pistore, M.; Barbon, F.; Bertoli, P.; Shaparau, D.; Traverso, P., "Planning and Monitoring Web Service Composition" (2004), AIMSA 2004, LNAI 3192, pp. 106-115 [retrieved from http://www.springerlink.com/content/21nucbh4rrjfk8av/fulltext.pdf].

Peer, J., "Web Service Composition as AI Planning—A Survey", (2005) [retrieved from http://decsai.ugr.es/~farco/CDoctorado/bibliografia/refPlanning4SW/LilnkedDocuments/webservice-composition-as-aiplanning-pfwsc.pdf].

Hepner, M., "Dynamic Changes to Workflow Instances of Web Services," (2007), University of Tulsa, [retrieved from http:/www.seat.utulsa.edu/papers/Hepner07-Dissertation.pdf].

A. Stentz, The Focused D* Algorithm for Real-Time Replanning (IJCAI-1995).

Narayanan, S., and McllRaith, S. 2002, Simulation, verification and automated composition of web services, in WWW'02.

Taverso, P., and Pistore, M. 2004, Automated composition of semantic web services into executable processes, in ISWC'04.

Heinlein, C. "Workflow and Process Synchronization with Interaction Expressions and Graphs", 2001, IEEE, p. 243-252.

Xie et al., "An additive reliability model for the analysis of modular software failure data", Oct. 24, 1995, IEEE, p. 188-193.

Groen et al., "Reliability data collection and analysis system", Aug. 24, 2004, IEEE, p. 43-48.

Camilo Rostoker, Alan Wagner, Holger Hoos, "A Parallel Workflow for Real-time Correlation and Clustering of High-Frequency Stock Market Data", (Mar. 26-30, 2007), Parallel and Distributed Processing Symposium, 2007, IPDPS 2007. IEEE International pp. 1-10 [retrieved from http://ieeexplore.ieee.org/stamp/stamp.jsp?tp=&arnumber=4227944&isnumber=4227918].

Rana et al., An XML Based Component Model for Generating Scientific Applications and Performing Large Scale Simulations in a Meta-computing Environment, Google 2000, pp. 210-224.

Santos-Neto et al., Tracking Usage in Collaborative Tagging Communities, Google 2007, pp. 1-8.

Li et al. Collaborative Tagging Applications and Approaches, IEEE Sep. 2008, pp. 1-8 (14-21).

Sheshagiri et al., "A Planner for Composing Services Described in DAML-S", ACM 2003, pp. 1-5.

Akkiraju et al., "SEMAPLAN: Combining Planning with Semantic Matching to Achieve Web Service Composition", American Association for Artificial Intelligence 2005, pp. 1-8.

D. Hinchcliffe, "A bumper crop of new mashup platforms", http://blogs.zdnet.com/Hinchcliffe/?p=111&tag=nl.e622, Jul. 23, 2007.

Navendu Jain, Lisa Amini, Henrique Andrade, Richard King, Yoonho Park, Philippe Selo and Chitra Venkatramani, "Design, Implementation, and Evaluation of the Linear Road Benchmark on the Stream Processing Core", Proceedings of ACM SIGMOD 2006.

Zhen Liu, Anand Ranganathan and Anton Riabov, "A Planning Approach for Message-Oriented Semantic Web Service Composition", in AAAI-2007.

Marti Hearst, Design Recommendations for Hierarchical Faceted Search Interfaces, ACM SIGIR Workshop on Faceted Search, Aug. 2006.

A. Riabov, Z. Liu. Planning for Stream Processing Systems. In Proceedings of AAAI-05, 2005.

Bohannon et al, "Optimizing view queries to ROLEX to support navigable results trees", ACM, pp. 1-12, 2002.

* cited by examiner

InRussia LeMonde Text TruncatedFeed

Yahoo Pipe

This pipe is Outputting:

- Russian translation of
- English translation of
- First 10 entries of
- Le Monde front page feed (in French)

Newspaper FeedCategory InEnglish NewYorkTimesFrontPage Text TruncatedFeed

Yahoo Pipe  *Guesses made by MARIO when user selects "Newspaper"*

This pipe is outputting:

- First 10 entries of
- New York Times front page feed

METHOD AND SYSTEM FOR SIMPLIFIED ASSEMBLY OF INFORMATION PROCESSING APPLICATIONS

GOVERNMENT INTERESTS

This invention was made with Government support under Contract No.: H98230-07-C-0383 awarded by Intelligence Agencys. The Government has certain rights in this invention.

BACKGROUND OF THE INVENTION

1. Technical Field

The present invention relates to automatic composition of information processing flows for user specified processing goals, and a computer-user interaction process for specifying the processing goals.

2. Discussion of the Related Art

In this section we first discuss current approaches to information processing that make use of components composed into flow graphs. We consider four different application areas: web 2.0 situational applications (i.e., mashups), info 2.0 information processing, traditional extract transform load (ETL) workflows, and stream processing.

At the end of this section we review existing work on automatic composition of flow graphs.

Web 2.0

Situational applications are an emerging trend in software development. For example, a number of software systems referred to as situational application platforms have been developed over the past few years. These systems allow end users to compose applications by combining reusable components. These systems often rely on a visual user interface to support this composition.

An overview of currently available situational application platforms can be found in D. Hinchcliffe, "A bumper crop of new mashup platforms", http://blogs.zdnet.com/Hinchcliffe/?p=111&tag=nl.e622.

The following situational application platforms make use of flow graphs to process information: 1) Apatar (http://www.apatar.com/for_structured_data_mashups.html), 2) Yahoo Pipes (http://pipes.yahoo.com), and 3) RSSBus (http://rssbus.com/).

A flow is a connected graph of configurable source components, aggregator components and transformation components, all of which read and produce information, for example, RSS or Atoms feeds. A description of RSS and Atom feeds can be found in D. Johnson, "RSS and Atom in Action: Web 2.0 Building Blocks", Manning Publications, Jul. 31, 2006, ISBN 1932394494.

Visual or text-based ways of selecting, configuring and connecting components are usually provided by the platform. For example, Yahoo Pipes provides a browser-based pipe composer GUI where users can select and configure components (i.e., modules) and establish connections therebetween. As an example, the modules for configuration and composition provided as part of Yahoo Pipes are as follows:

1) Sources (all producing RSS feeds)—Fetch feed (from a specified URL that is assumed to point to an RSS feed), Fetch Data (from a specified URL, in XML or JSON form), Flickr (with specified tags and location preferences), Google Base (with specified location, category and keywords), Yahoo! Local (finding keyword X within N miles of keyword Y), Yahoo! Search (given search string); 2) User inputs—Date input (produces date), Location input (produces location), Number input (produces number), Text input (produces text), URL input (produces url); 3) Operators—Content analysis, Count, Filter, For Each: Annotate, For Each: Replace, Location Extractor, Regex, Rename, Sort, Split, BabelFish, Truncate, Union, Unique; 4) URL—URL Builder; 5) String—String Concatenate; 6) Date—Date Builder; Date Formatter; 7) Location—Location Builder; and 8) Number—Simple Math.

A flow graph (i.e., a pipe in Yahoo Pipes) is formed as a selection of the above modules, where each module may appear once, more than once or not at all. Each module included in the pipe can be individually configured. The modules forming the pipe must be connected. The connections are established between producing and receiving endpoints of the same type. For example, an output of the URL Builder module (which is of type url) can be connected to the input parameter URL of the Fetch Feed module, requiring url type.

The Yahoo pipe editor (at http://pipes.yahoo.com) is shown in FIG. 1. The modules included in the list on the left can be dragged with a mouse and dropped onto the composition pane in the center. When dropped, the modules expand to provide editing controls for specifying parameters.

As shown in FIG. 1, the parameters can be specified by entering strings (e.g., "5" in "Find" field of "Flickr" module) or by connecting modules that produce data of compatible types (e.g., "images of" field of "Flickr" module is connected to "Image of (text)" module). In addition, parameter values can be provided by users via input modules (e.g., "Near (location)" and "Image of (text)".

Editors like the Yahoo Pipes editor simplify flow composition for expert users who have deep understanding of the modules and their parameterization. However, visual editors can be confusing to a broader audience who do not have good knowledge of the modules and their capabilities. In addition, even for expert users the manual pipe composition process can become tedious if it must be repeated for processing different sources using the same flow graph with minor differences (such as including format adaptor modules required for connecting to different types of sources).

Info 2.0

While Web 2.0 approaches tend to focus on data available on the web and that is represented in formats like RSS, similar approaches have been used to process data not represented as RSS or Atom feeds. DAMIA service developed by IBM is one such example. This service is currently available for evaluation on the Internet at the URL http://services.alphaworks.ibm.com/damia/.

DAMIA service consists of a browser-based Web application for assembling, modifying and previewing mashups, services for handling storage and retrieval of data feeds created within the enterprise as well as on the Internet, a repository for sharing and storing feeds or information created by DAMIA, and services for managing feeds and information about mashups, search capabilities, and tools for tagging and rating mashups.

Similarly to Web 2.0 flow graphs in Yahoo Pipes, flow graphs in DAMIA are constructed using a visual editor.

Extract Transform Load (ETL)

IBM Websphere Datastage http://www.ibm.com/software/data/integration/datastatge/ is an example of an ETL tool. It provides a visual development environment to construct ETL processes, and includes an engine for real-time operation of the processes. In general, ETL processes can be implemented in any programming language, but specialized tools like Datastage simplify the implementation by using visual development environments, and provide automatic scalability for workflows in those environments. The specialized tools specify the processes as information flow graphs extracting data from data sources, e.g., databases, transforming the data using transformation operators and finally loading the resulting data into result databases. Generally, extract, load and transform operators can be viewed as components, and ETL processes as flow graphs of those components. In that conceptual level, the composition of ETL flow graphs presents similar problems to the composition of Web 2.0 and Info 2.0 flow graphs.

Stream Processing

IBM System S research project in the area of stream processing has been focused on distributed processing of high-rate data streams of unstructured information. While performance requirements of stream processing are significantly different from those of Info 2.0, flow graphs are very similar. A description of System S and stream processing core (SPC) of the system can be found in Navendu Jain, Lisa Amini, Henrique Andrade, Richard King, Yoonho Park, Philippe Selo and Chitra Venkatramani, "Design, Implementation, and Evaluation of the Linear Road Benchmark on the Stream Processing Core", Proceedings of ACM SIGMOD 2006.

Automatic Composition

Automated planning can be used to create composite applications in compositional architectures such as web services and stream processing. The applications are processing graphs composed of smaller modular components such as service invocations, data processing operators, or other (smaller) processing graphs.

In many scenarios the components are service invocations (such as web service invocations or an invocation of a method of a java class), and can be described in terms of their data effects and preconditions. In particular, we assume that a description (such as WSDL or Java object code with optional metadata annotations) of each service specifies the input requirements of the service (such as data type, semantics, access control labels, etc.). We refer to these input requirements as preconditions of service invocation, or simply preconditions. The description also specifies the effects of the service, describing the outputs of the service, including information such as data type, semantics, etc. In general, a component description may describe outputs as a function of inputs, so that the description of the output can only be fully determined once the specific inputs of the component have been determined. In practical implementations the invocations can be synchronous, such as subroutine or RPC calls, or asynchronous, such as asynchronous procedure calls, message exchange or message flow.

Under these assumptions, an automated planner can then be used to automatically assemble processing graphs based on a user-provided description of the desired output of the application. The descriptions of the components are provided to the planner in the form of a domain description. The planner can also take into account the specification of available primal inputs to the workflow if not all inputs are available for a particular planning request.

The planner composes a workflow by connecting components, starting from the primal inputs. It evaluates possible combinations of components, by computing descriptions of component outputs, and comparing them to preconditions of components connected to the output. More than one component input can be connected to one component output or one primal input. Logically, this amounts to sending multiple copies of data produced by the component output, with one copy sent to each of the inputs. In practical implementation, these do not have to be copies, and it is possible to pass data by reference instead of by value. The process terminates when an output of a component (or a set of outputs taken together) satisfies the condition specified in the user requirement. All conditions are evaluated at plan time, before any applications are deployed or executed.

If multiple alternative compositional applications can be constructed and shown to satisfy the same request, the planner may use heuristics and utility functions to rank the alternatives and select preferred plans.

The application, once composed, is deployed in an execution environment and can be executed one or more times.

Examples of a planner and an execution environment are described in Zhen Liu, Anand Ranganathan and Anton Riabov, "A Planning Approach for Message-Oriented Semantic Web Service Composition", in AAAI-2007.

Similar work has been done in the contexts of Stream Processing, Web Services and Grid Computing.

Although existing planning methods can achieve goal-based composition, they do not have a convenient form to provide assistance to a user specifying goals. Thus, a user may not be aware of the vocabulary used in specifying system capabilities, and therefore, may have to invest time in learning the vocabulary which could be evolving.

Faceted Search

Faceted search methods use tags to define the scope of user interaction with a system. However, faceted search is limited to searching over existing information represented, for example, as documents, web pages or feeds.

One notable example of a faceted search interface is FLAMENCO search, (http://flamenco.berkeley.edu/). An overview of interfaces for managing faceted search is presented in Marti Hearst, Design Recommendations for Hierarchical Faceted Search Interfaces, ACM SIGIR Workshop on Faceted Search, August, 2006.

SUMMARY OF THE INVENTION

In an exemplary embodiment of the present invention, a method for automatic composition of an information processing flow based on a user-specified processing goal, comprises: selecting tags from a first plurality of tags, wherein the selected tags specify a processing goal; composing a processing graph in accordance with the processing goal; and displaying a second plurality of tags, wherein the second plurality of tags includes tags that are only relevant to the selected tags.

The method further comprises displaying the first plurality of tags, wherein the tags are selected by clicking on individual tags in the first plurality of tags.

The tags are selected by inputting individual tags into a search string.

The processing graph is composed by using primal data feeds and processing modules described in a planning language. Descriptions of the primal data feeds and processing modules are represented as actions, with preconditions and effects of the actions corresponding to annotations on inputs and outputs of the primal data feeds and processing modules. Composing the processing graph comprises: generating a description of the processing goal, wherein the processing goal is represented using predicates; invoking a planner to generate a plan for the actions that satisfy the processing goal; and translating the plan into the processing graph.

The method further comprises: deploying the processing graph in a deployment environment; displaying an output data feed produced by the processing graph in the deployment environment. The processing graph is deployed as a web service, wherein the web service responds to requests by returning an RSS feed or an Atom feed.

The method further comprises displaying the processing graph.

In an exemplary embodiment of the present invention, a method for automatic composition of information processing flows based on user-specified processing goals, comprises: receiving a processing goal, wherein the processing goal corresponds to a set of tags selected from a tag cloud; wherein after the processing goal is received: displaying the set of tags corresponding to the processing goal; generating a processing graph that produces an output feed with annotation containing all tags corresponding to the goal; and generating a next tag cloud; wherein after the processing graph is generated: generating a preview of results of the output feed and displaying the preview of results; displaying implied and guessed tags corresponding to the processing graph; and displaying a text description of the processing graph; wherein after the next tag cloud is generated: displaying the next tag cloud.

The next tag cloud is pre-computed or dynamically computed.

The preview of results is generated by: deploying the processing graph as a web service in an execution environment; invoking the web service to retrieve a response; and displaying the retrieved response from the web service as the preview of results produced by the processing graph.

The method further comprises modifying the processing goal by selecting tags in the next tag cloud and repeating the steps performed after the processing goal is received.

In an exemplary embodiment of the present invention, a computer-user interface for displaying information processing flows based on user-specified processing goals, comprises: a first display area for displaying a first plurality of tags, wherein individual tags can be selected and added to a processing goal; a second display area for displaying a processing graph, the processing graph being composed in accordance with the processing goal; and a third display area for displaying a preview of an output feed produced by the processing graph after the processing graph has been deployed in a deployment environment.

The computer-user interface further comprises a fourth display area for displaying the selected tags, implied tags and guessed tags, wherein the implied tags are tags that always appear together with the selected tags, and the guessed tags are tags that are assigned to the output feed.

The computer-user interface further comprises a fifth display area for displaying a text description of the output feed.

The computer-user interface further comprises a search string for receiving individually input tags that are to be added to the processing goal. The first plurality of tags is displayed as a tag cloud.

After individual tags have been selected and added to the processing goal, the first display area displays a second plurality of tags, wherein the second plurality of tags includes tags that are only relevant to the selected tags.

In an exemplary embodiment of the present invention, a computer program product comprises a computer useable medium having computer program logic recorded thereon for automatic composition of an information processing flow based on a user-specified processing goal, the computer program logic comprising: program code for receiving selected tags that specify a processing goal, wherein the tags were selected from a first plurality of tags; program code for composing a processing graph in accordance with the processing goal; and program code for displaying a second plurality of tags, wherein the second plurality of tags includes tags that are only relevant to the selected tags.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Presented herein is a system that assembles and configures new compositional applications automatically based on user-selected output properties. The system uses tag clouds to guide the user in this process, provides instantaneous feedback by showing a preview of the resulting output, and updates the tag cloud based on selected tags.

This invention applies to composition of applications by instantiating, configuring and connecting processing components. The processing components analyze, transform, correlate, join and otherwise process data. The composition of connected and parameterized module instances is referred to as a processing graph. Once composed, the processing graph is presented to the user. The system can also present a preview of results generated by the application, request entry of parameters, and deploy the processing graph to generate a preview of the results.

The following are key innovations of the invention: 1) Semantics-based tagging of feeds; 2) Tag-based selection of feeds; 3) Tag-based automatic composition of processing graphs; and 4) Seamless tagging and navigation across both existing and potentially composable feeds.

Example target platforms can be web services that process any type of syndication feeds (RSS or Atom), web services receiving and producing general messages, data transformation workflows such as ETLs, stream processing systems such as System S, and other types of applications such as those described in the Background section of this disclosure.

Figure 1:
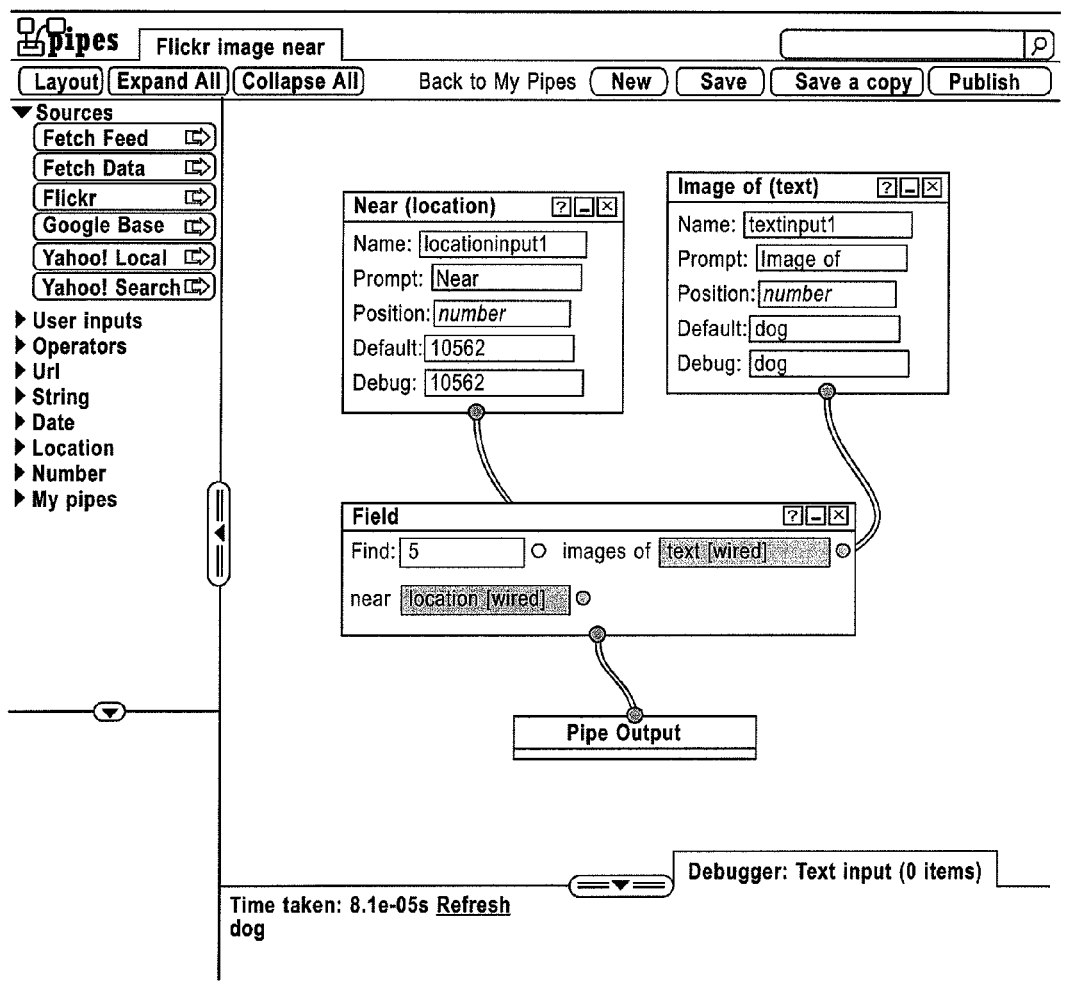
FIG. 1 is a screen capture of a Yahoo Pipes editor showing an example of a flow graph.
Figure 2:
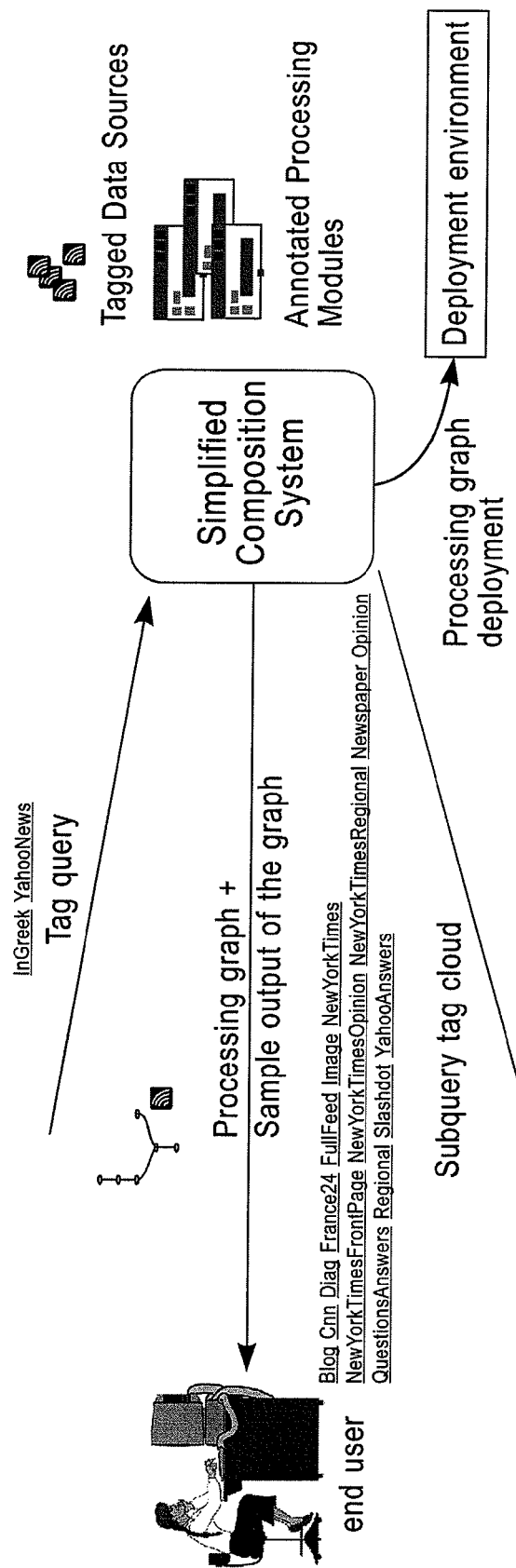
FIG. 2 shows an overview of a system according to an exemplary embodiment of the present invention.

FIG. 2 shows an overview of the system. As shown in FIG. 2, in response to a tag query received from a user, the system composes a processing graph, deploys the graph in a deployment environment, and presents an output data feed produced by the processing graph to the end user. To create the processing graph the system uses annotated primal data feeds and annotated processing modules. The deployment environment is, for example, an RSS feed processing environment similar to the Yahoo Pipes website at http://pipes.yahoo.com. Similar environments have been developed at IBM (http://projectzero.org).

Figure 3:
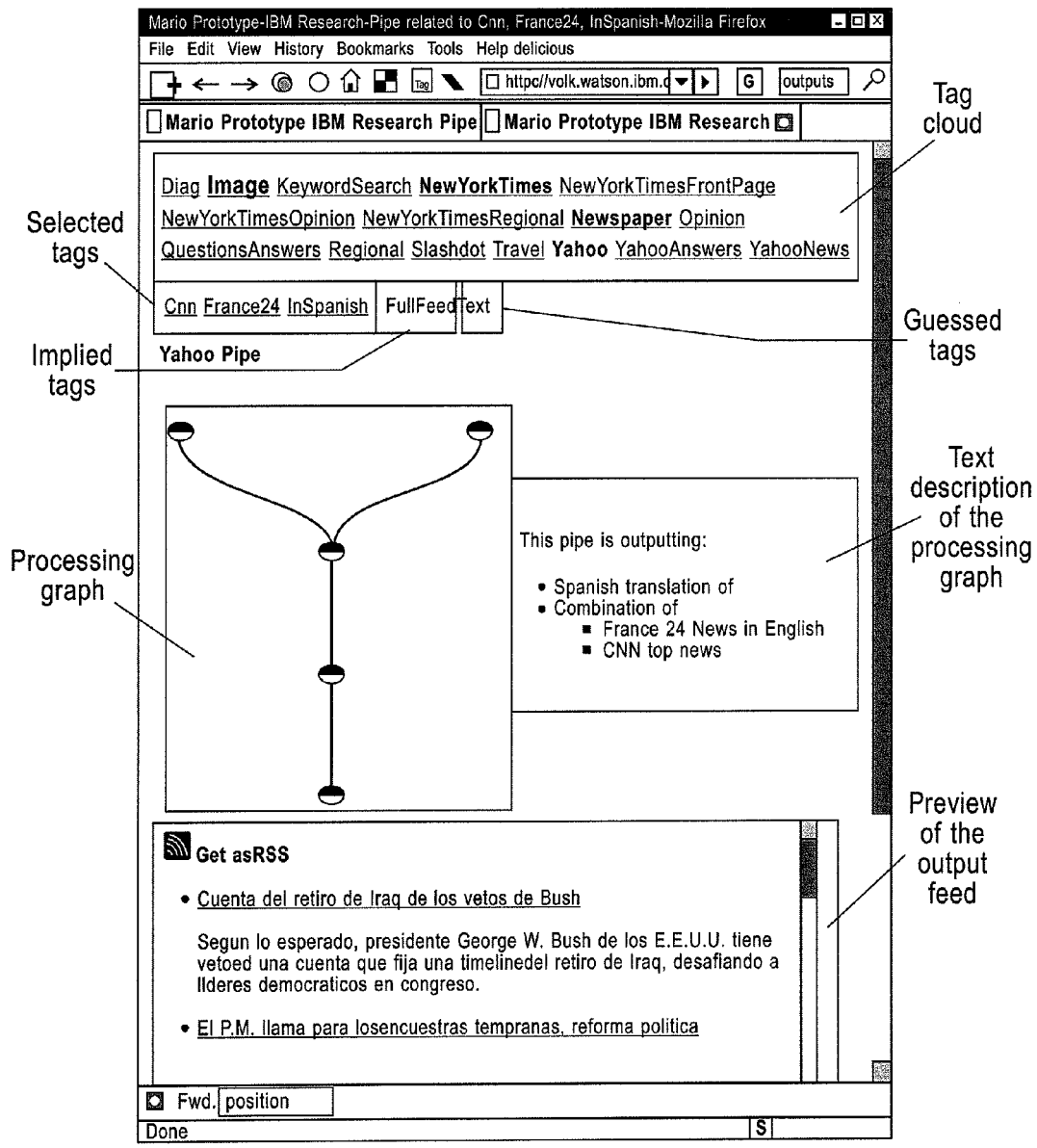
FIG. 3 shows elements of a user interface of the system according to an exemplary embodiment of the present invention.

In FIG. 3, the elements of a user interface of the system are shown. These elements are explained below. Note that the contents of all elements of the interface are updated when new goals are specified by the user.

A tag cloud is a weighted list of tags. Weights reflect the popularity of tags. Clicking on any tag in the tag cloud adds the tag to the planning goal, and to the list of selected tags. This also leads to a new processing graph being composed, and a new tag cloud. The new tag cloud is created in the context of currently selected tags. In particular, the new tag cloud does not include the selected tags or any other tags that never appear on the same feed description where all selected tags appear. When the new processing graph is constructed, it is immediately deployed and an output feed is shown in a preview window.

Implied tags are tags that always appear together with the selected tags. Guessed tags are tags assigned to the output of the graph, and such they do not appear in implied or selected tags.

A processing graph element is a description of the processing graph in graphical form. Clicking on the graph opens an editor window, where the graph can be modified after automatic composition. The editor can be provided by the target execution environment.

A text description of the processing graph is created based on the set of modules included in the processing graph. In our implementation, hovering a mouse over modules in a graphical representation on the left causes a highlight to appear on the corresponding line of the textual description on the right.

A preview (or full view) of results produced by the composed and deployed processing graph is shown in the bottom of the window.

The user interface may also include a search string, where tag goals can be typed in, as an alternative to clicking tags in the tag cloud.

We now describe the invention in detail. The description is written in terms of components (e.g., modules) that process RSS feeds. This does not prevent the system from being used with any similar information processing applications.

User Interface and System Operation

Users interact with the system by specifying processing goals as a set of tags via the user interface shown in FIG. 3. The system responds by generating a processing graph that outputs information that satisfies this goal. The system also updates the user interface elements.

Figure 4:
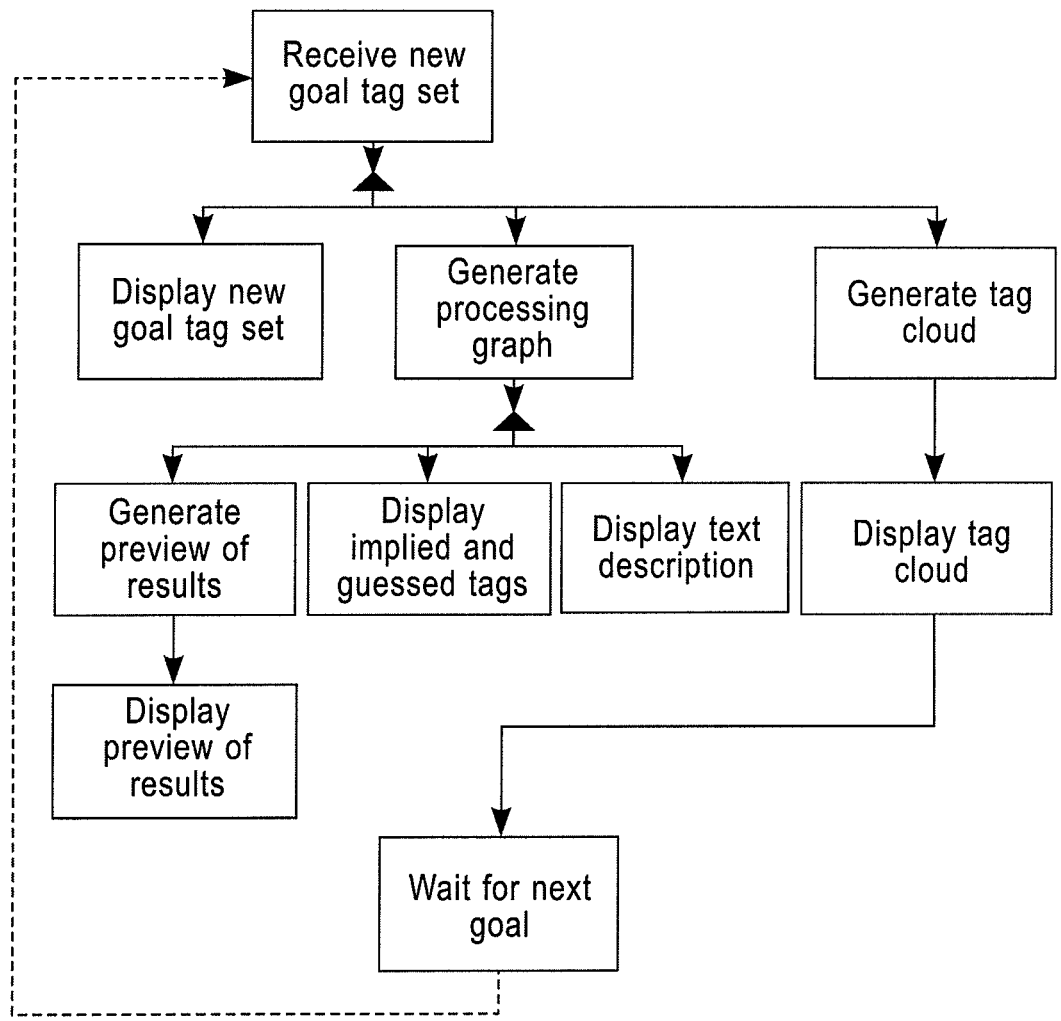
FIG. 4 shows the operations that the system performs when a user specifies a new goal according to an exemplary embodiment of the present invention.

FIG. 4 shows the operations that the system performs when a user specifies a new goal. First, it receives the new goal tag set from the user. This can be a result of clicking a tag in the tag cloud, entering the set of tags directly, or specifying the set of tags using other means.

Once the new goal tag set is obtained, the system can in parallel display the new selection of tags corresponding to the goal (i.e., simply echoing user input), generate a processing graph that produces an output feed with annotation containing all goal tags, and generate the next tag cloud. The next tag cloud, for example, can be pre-computed for each goal specification. If that implementation is chosen, the pre-computed tag cloud is retrieved and displayed. Tag clouds can also be computed dynamically for each new goal.

Once the tag cloud is generated and shown, the user can click tags in the tag cloud to modify the current goal (by adding the clicked tag). The user can also click on tags already included in the goal, and thus remove the tags from the goal. Both of these operations change the goal, and restart the user interface update procedure in FIG. 4 from the beginning.

Once the processing graph has been generated, the system can, in parallel or in any order, perform the following operations: generate a preview of results, display implied and guessed tags corresponding to the processing graph, and display a text description of the processing graph. Once the preview of results is generated, it is also shown. For example, one method of generating a preview of results is to deploy the generated processing graph in the corresponding execution environment to invoke it, and display a returned response from the deployed processing graph as the preview of results produced by this graph.

Tagging of Data Sources and Derived Feeds

Internally, the system uses Stream Processing Planning Language (SPPL) described in A. Riabov, Z. Liu. Planning for Stream Processing Systems. In Proceedings of AAAI-05, the disclosure of which is incorporated by reference herein in its entirety, for representing the descriptions of feeds and transformation modules. In SPPL, each feed is described by predicates (e.g., predicates corresponding to keywords or tags). In addition, there are rules for computing descriptions of feeds derived from other feeds by applying modules. Hence, the system can match goals specified as tags to feeds, by determining a match if the goal specified as a set of tags is a subset of the tags in the description of a feed. We can also create tag clouds using tag popularity over the descriptions of both the existing and not yet existing, but potentially composable, feeds.

Figure 5:
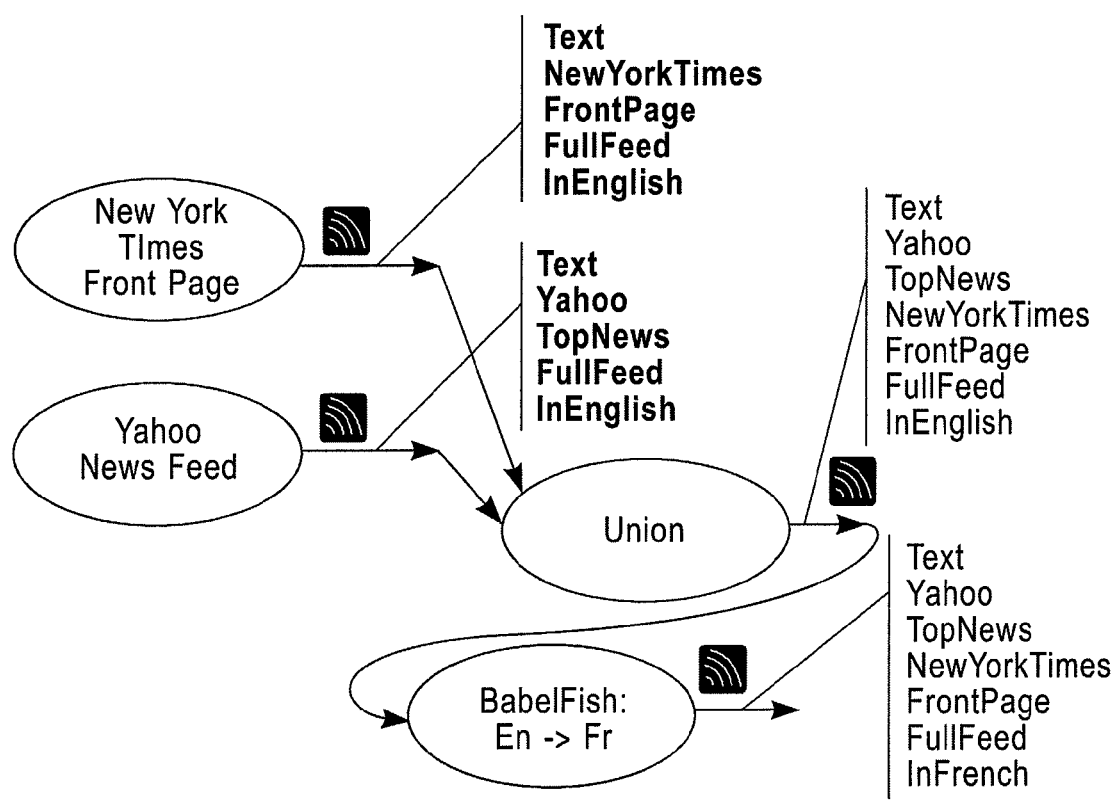
FIG. 5 illustrates the annotation of component outputs with tags according to an exemplary embodiment of the present invention.

FIG. 5 illustrates the annotation of component outputs with tags. It is assumed that primal sources (feeds) are annotated manually. Manually created annotations are shown in bold font. The system uses descriptions of components and annotations specified on feeds to compute annotations on feeds that are outputs of the components, when applied to other feeds. This computation can be applied recursively. Descriptions of components specify for each component the rules for computing the set of tags described by the output given descriptions of the component inputs. For example, these rules can specify which tags are carried from input to output, which ones are not carried, and which tags are added to output independently of their presence in the input. SPPL provides one way of specifying these rules by describing the components as SPPL actions, and specifying the preconditions and the effects of the actions.

In one embodiment, tag clouds are generated by computing a weight value for each tag in the context of the currently selected goal. This is accomplished by analyzing the descriptions of all existing and potentially generated feeds that can be matched to the current goal (or descriptions of all existing feeds, if there is no goal currently specified). The weight of a tag in this case is taken to be equal to the number of such descriptions that contain the tag.

Generating Processing Graphs for Specified Goals

In one embodiment, the goals are represented using SPPL predicates, and the descriptions of components and feeds are represented as SPPL actions, with preconditions and effects corresponding to annotations on inputs and outputs of these actions. The task of generating the processing graph is then accomplished by invoking an SPPL planner to generate the highest quality plan for the specified set of actions and the goal. The plan produced by the SPPL planner can then be translated trivially into a processing graph, by mapping action instances included in the plan to instances of corresponding components in the processing graph, and establishing connections between component instances accordingly. It is also possible that the SPPL planner does not find any plans satisfying the goal. In this case, the planner reports an error condition, which is reflected in the user interface and the processing graph is not generated.

To represent descriptions of components and feeds in SPPL, an SPPL domain description must be created. The file containing the SPPL domain description is part of the system configuration, and is not changed when new user-defined goals are processed. For example, consider the following SPPL planning domain definition:

```
(define (domain Example)
  (:types
        _Source
    News - _Source
    Opinion - _Source
    Newspaper - News
    NewYorkTimes - Newspaper
    (NYTOpinion - NewYorkTimes Opinion)
    _Language
    InEnglish - _Language
    InFrench - _Language )
  (:constants
    NYTOpinion - NYTOpinion
    InEnglish - InEnglish
    InFrench - InFrench )
  (:predicates
        (source ?x - _Source)
        (language ?x -_Language) )
  (:action NYTOpinionFeed
    :cost(-1000 1)
    :effect [a_OUTPUT] (and
        (source NYTOpinion)
        (language InEnglish) )
  )
  (:action TranslateEnFr
    :parameters(?Source - _Source)
    :cost(-5 1)
    :precondition[a_INPUT] (and
        (source ?Source)
        (language InEnglish) )
    :effect[a_OUTPUT] (and
        (source ?Source)
        (language InFrench) )
  )
)
```

This domain description defines several types that correspond to tags, such as 'News' and 'InEnglish', which are typed constants of several of the types, two predicates, 'source' and 'language' and two actions, 'NYTOpinionFeed' and 'TranslateEnFr'. The two actions describe, correspondingly, an RSS feed downloadable from New York Times website and a component performing language translation from English to French. The cost vectors of actions specified in the ':cost' statements are used to compute a multi-dimensional cost value of the plan, which is computed according to SPPL rules, i.e., by component-wise addition of cost vectors. The effect of the 'NYTOpinionFeed' action describes the corresponding feed using a ground formula expressed with predicates and constants. Similarly, the effect of the translation component describes the output of the component. However, action 'TranslateEnFr' has a parameter ?Source of type Source, which is used in the expressions defining the precondition and the effect. According to SPPL rules this indicates that the output of the component is related to the same source with (source ?Source) predicate as its input, as translation operator does not affect the source of the feed. SPPL requires that in valid plans all action parameters are bound to specific values and that all preconditions are satisfied with the descriptions of connected streams. Port names, e.g., [a OUTPUT], are used to assign conditions to specific input and output ports and avoid ambiguity for components that have more than one input or more than one output.

The SPPL description of the goal is generated for the user-specified goal (i.e., set of tags), by matching tags specified in the goal to type names and including into the SPPL goal expression all predicates that have parameters of corresponding type or a super-type of the corresponding type. For example, for a goal specified as 'Newspaper in French' the generated SPPL goal description will be:

```
(define (problem ExampleGoal)
  (:domain Example)
  (:goal
    :parameters(?x - Newspaper ?y - InFrench)
    :precondition
    (and
        (source ?x)
        (language ?y)
    ) )
  (:objective -1 0)
  (:bound 1000000 40)
)
```

Here we have extended the traditional SPPL with a parametric goal—in original SPPL the goals do not have parameters and must be specified as ground formulas. The parametric goal is interpreted similarly to a parametric action without effects, i.e., the goal is considered satisfied when the precondition is satisfied with at least one assignment of parameter values. The output of the SPPL planner is a plan. In the example described above, the SPPL planner output is:

```
<planset>
<plangraph
    problem="ExampleGoal"
    objective="1005"
    cost="-1005,2">
    <node id="0" name="NYTOpinionFeed">
        <port name="a_OUTPUT">
    <a name="language"><p>InEnglish</p></a>
    <a name="source"><p>NYTOpinion</p></a>
        </port>
    </node>
    <node id="1"
name="TranslateEnFr"><p>NYTOpinion</p>
        <port name="a_OUTPUT">
    <a name="language"><p>InEnglish</p></a>
    <a name="language"><p>InFrench</p></a>
    <a name="source"><p>NYTOpinion</p></a>
        </port>
    </node>
    <node id="2" name="Goal_0">
    <p>NYTOpinion</p><p>InFrench</p>
        <port name="g0">
    <a name="-Goal_0"/>
    <a name="language"><p>InEnglish</p></a>
    <a name="language"><p>InFrench</p></a>
    <a name="source"><p>NYTOpinion</p></a>
        </port>
    </node>
        <link fromNode="0" fromPort="a_OUTPUT"
toNode="1" toPort="a_INPUT"/>
        <link fromNode="1" fromPort="a_OUTPUT"
```

```
        toNode="2" toPort="Port1"/>
            <link fromNode="2" fromPort="g0"
        toNode="-2" toPort="_goal"/>
          </plangraph>
          </planset>
```

The planner output describes a processing graph that consists of an instance of NYTOpinionFeed with the single output of that feed connected to the single input of Translater-EnFr component, with the single output of that component connected to the goal, i.e., the final output of the plan.

This processing graph description is subsequently translated into a processing graph description recognized by the runtime, and can then be deployed for execution.

Navigation Using Tag Clouds

Tag clouds are weighted lists of keywords (tags). One way to present a tag cloud visually is to display tags with higher weights in larger fonts. This method of showing a tag cloud has become the de-facto standard for presenting weighted lists of tags on the Internet, and is used by a large number of web sites, including flickr.com, del.icio.us, and others. Traditionally, tag clouds are used to select content that is relevant to exactly one selected tag (for example, Flickr, technorati, del.icio.us, etc.). In our system, users can select a subset of tags for a more precise description of the goal. For each new selection of tags, a new tag cloud is generated reflecting tag popularity only among the feeds that are relevant to all tags already selected.

Figure 6:
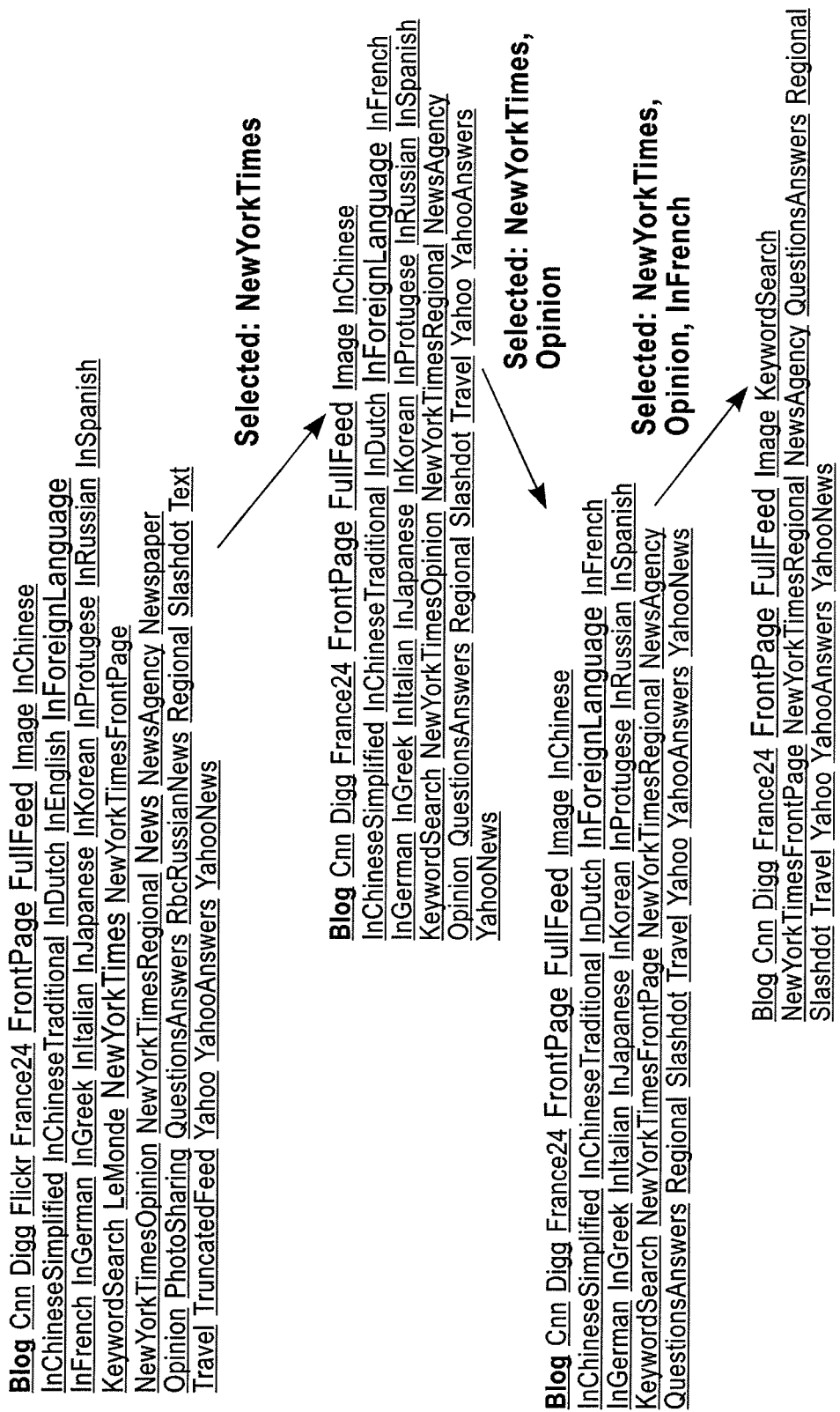
FIG. 6 illustrates navigation using tag clouds according to an exemplary embodiment of the present invention.

In our system, each tag in the tag cloud is a hyperlink, clicking on which results in a transition to the screen where this tag is added to the set of selected tags. Other elements of the screen are updated accordingly with the selection. In particular, as described in this subsection, the tag cloud is replaced by a refined tag cloud that contains only the tags that can be combined with the current set of selected tags. As shown in FIG. 6, as tags are added to the set of selected tags, the smaller the set of tags to be selected becomes.

Semantically Extended Tagging

Semantic information can be used to extend tagging of streams automatically, given a short description provided by users. For example, OWL ontologies can be used, possibly complemented by DL-reasoning or other types of reasoning, to extend the set of tags provided by the user by other related terms specified in the ontology. This can be achieved by specifying a mapping between the tags and ontology artifacts such as URIs, and automatically adding tags mapped to URIs that are related to URIs mapped to user-provided tags.

Figure 7:
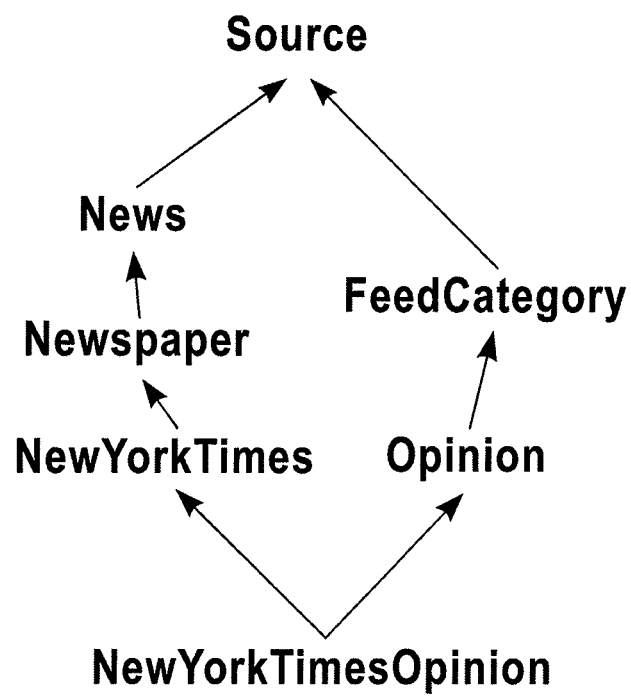
FIG. 7 illustrates a taxonomy fragment according to an exemplary embodiment of the present invention.

In one embodiment, tags can be organized in a taxonomy with multiple inheritance. The taxonomy can be specified in OWL-DL, RDFS or in other representations. When a feed is annotated with a tag, all ancestor tags are automatically added to the feed. For example (see FIG. 7), adding NewYorkTimesOpinion tag automatically adds Opinion, NewYorkTimes, Newspaper and News to the same annotation for the purposes of computing tag clouds and matching feeds to goals. Therefore, a feed annotated with "NewYorkTimesOpinion" will be a match to a goal "Newspaper". In our implementation, SPPL type system is used to represent and reason about taxonomies in an efficient manner.

Composing Parametric Processing Graphs

Figure 8:
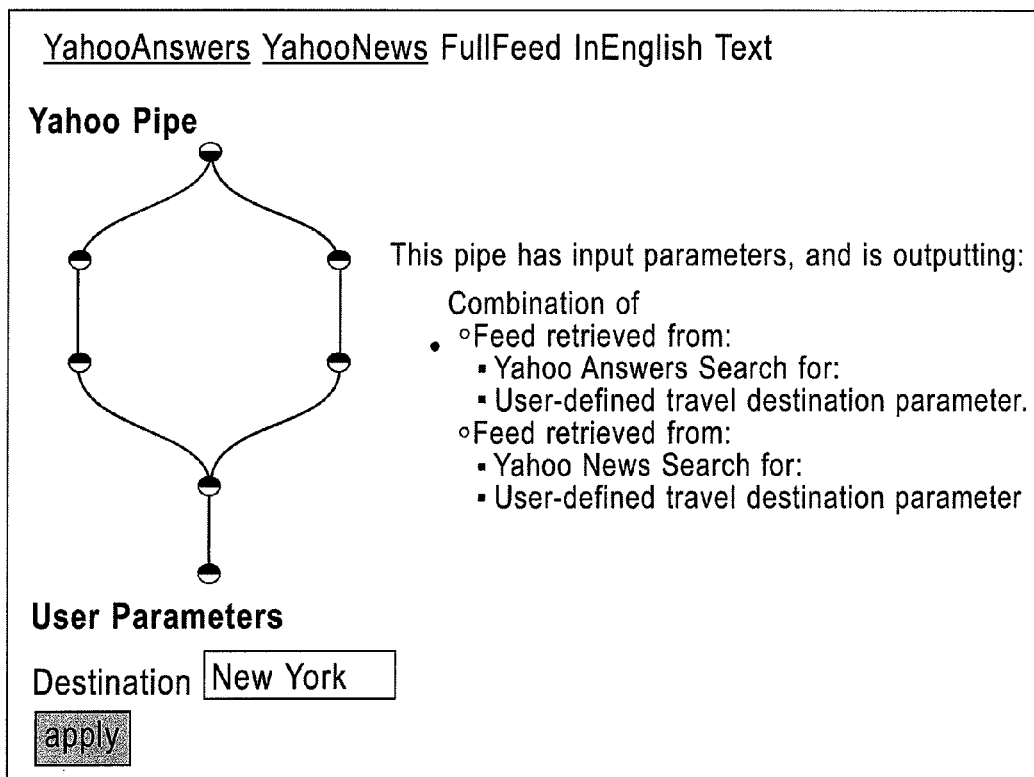
FIG. 8 illustrates composing parametric processing graphs according to an exemplary embodiment of the present invention.

In some deployment environments, deployed processing graphs can be configured as web services that can receive user-defined parameters for use in processing feeds. Our system can compose parametric pipes. An example of this is shown in FIG. 8. One difficulty is in identifying when two parametric modules should use the same parameter value. In our system we use a classification of parameters to address this: parameters of the same type can be matched to the same value, and different type parameters require separate values. Our system can also "hardcode", i.e., embed, values of configuration parameters into processing graphs, for example, when there are source feeds specific to the parameter value, e.g., NewYork.

Optimization

Figure 9:
FIG. 9 illustrates optimization according to an exemplary embodiment of the present invention.

Our system finds optimal solutions for satisfying goals by evaluating possible quality/resource tradeoffs. In the example shown in FIG. 9, the shortest path in translation of LeMonde from French to Russian is found (here we assume that in this configuration no direct translation module between French and Russian is available, and therefore the intermediate translation to another language, in this case English is required).

Intelligent Guessing

Figure 10:
FIG. 10 illustrates intelligent guessing according to an exemplary embodiment of the present invention.
Figure 10:
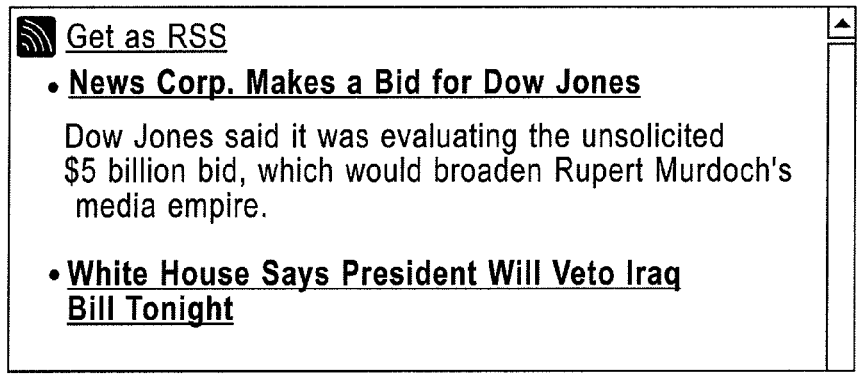

Selected tags may not provide enough information. Our system uses quality estimates (same as used for selecting optimal processing graphs) to make a best guess of what the intentions of the user were. An example of this is shown in FIG. 10. The best quality processing graph among all processing graphs satisfying all goal constraints is selected and presented.

Implementation

In one embodiment, the system can be implemented as a web application written in Java language. Users interact with the system by using a browser that displays the user interface elements described above, and implements the process described above. The web application keeps track of users, their sessions and currently processed requests. The web application interacts with the operating environments to deploy processing flows on behalf of these users.

Figure 11:
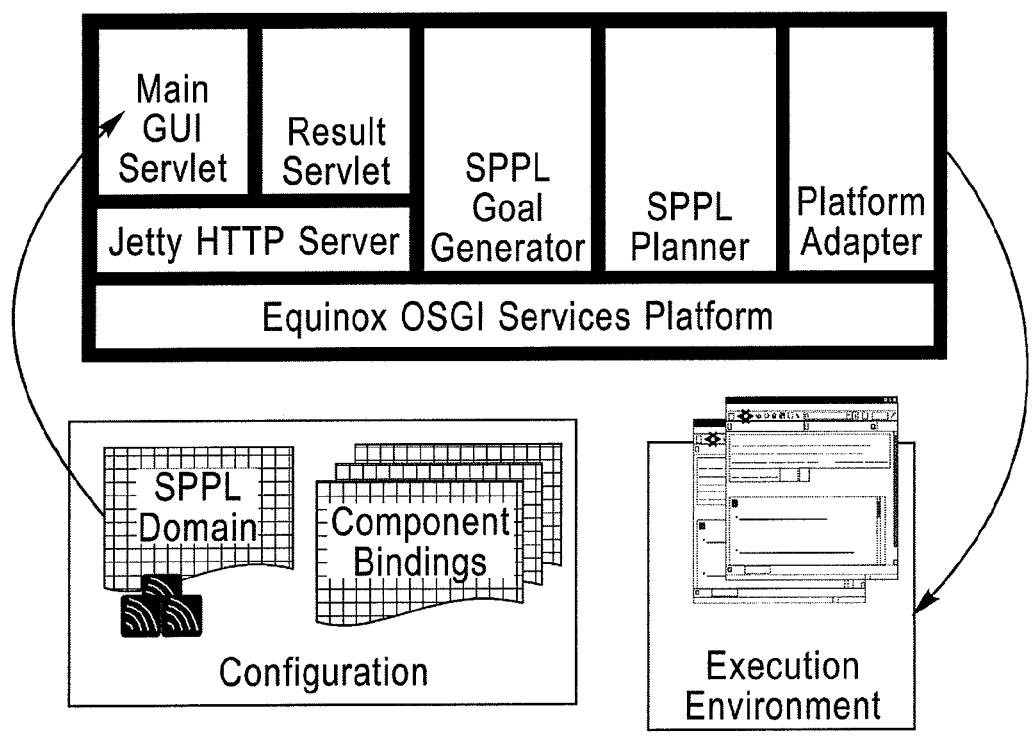
FIG. 11 illustrates the architecture of a system according to an exemplary embodiment of the present invention.

FIG. 11 shows an example architecture of the system. The system consists of several modules implemented as OSGi services deployed on an Eclipse Equinox (http://www.eclipse.org/equinox/) implementation of an OSGi platform (http://www2.osgi/org/Specifications/HomePage#Release4). The GUI is implemented by two servlets, the Main GUI Servlet that generates the screen shown in FIG. 3 and the Results Servlet that generates the "preview of the output feed" screen element shown in FIG. 3.

Jetty web server (http://jetty.mortbay.com/), integrated with OSGI platform, is used to host the servlets. SPPL Goal Generator service generates SPPL goal descriptions based on a user-specified set of tags submitted via the Main GUI Servlet.

SPPL Planner service invokes an SPPL planner to process the generated goal and generate a processing graph. Examples of a planner and an execution environment are described in Zhen Liu, Anand Ranganathan and Anton Riabov, "A Planning Approach for Message-Oriented Semantic Web Service Composition", in AAAI-2007, the disclosure of which is incorporated by reference herein in its entirety.

The Platform Adapter service translates the processing graph produced by the SPPL planner to the format recognized by the target execution environment. The Platform Adapter service can also include procedures for deploying the translated processing graph in the target execution environment, for invoking the deployed processing graph and retrieving results of its execution, and for generating a preview of results received from the processing graph.

The system is configured by providing an SPPL domain description that includes descriptions of all feeds and components, and optionally a set of component bindings. The component bindings are files used by the platform adapter to generate a platform-specific representation of the processing graph. The component bindings are typically represented as templates, with one template provided for each component, with placeholders that are filled in by the platform adapter to represent connections between components in generated processing graphs.

For example, if the target platform accepts processing graphs represented in XProc (http://www.w3.org/TR/xproc/), a platform-specific representation of the processing graph (the SPPL planner output shown above) is shown below:

```
<p:pipeline
    xmlns:p="http://www.w3.org/2007/03/xproc"
    xmlns:ex="http://www.example.com/example">
    <p:input port="source"/>
    <ex:NYTOpinionFeed name="id0"/>
    <ex:TranslateEnFr name="id1">
        <p:input port="a_INPUT">
            <p:pipe step="id0" port="a_OUTPUT"/>
        </p:input>
    </p:TranslateEnFr>
    <p:output port="result">
        <p:pipe step="id1" port="a_OUTPUT"/>
    </p:output>
</p:pipeline>
```

This representation uses custom steps in the pipeline, namely NYTOpinionFeed and TranslateEnFr which are assumed to be custom steps recognized by the target platform. This representation can be assembled from binding templates shown below where variables denotes with '@' characters, e.g., '@id@', are replaced by the Platform Adapter during processing graph translation:

```
NYTOpinionFeed:
<ex:NYTOpinionFeed name="@id@"/>
TranslateEnFr:
<ex:TranslateEnFr name="@id@">
    <p:input port="a_INPUT">
        <p:pipe step="@in_id@" port="@in_port@"/>
    </p:input>
</p:TranslateEnFr>
```

It should be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for automatic composition of an information processing flow based on a user-specified processing goal, comprising:
    selecting tags from a first plurality of tags, wherein the selected tags specify a processing goal;
    composing a processing graph in accordance with the processing goal, wherein the processing graph produces an output feed with annotation containing the selected tags; and
    displaying a second plurality of tags in response to the selection of the tags from the first plurality of tags, wherein the second plurality of tags does not include the selected tags,
    wherein after the processing graph is composed:
    generating a preview of results of the output feed and displaying the preview of results;
    displaying implied and guessed tags corresponding to the processing graph; and
    displaying a text description of the processing graph.

2. The method of claim 1, further comprising:
    displaying the first plurality of tags, wherein the tags are selected by clicking on individual tags in the first plurality of tags.

3. The method of claim 1, wherein the tags are selected by inputting individual tags into a search string.

4. The method of claim 1, wherein the processing graph is composed by using primal data feeds and processing modules described in a planning language.

5. The method of claim 4, wherein descriptions of the primal data feeds and processing modules are represented as actions, with preconditions and effects of the actions corresponding to annotations on inputs and outputs of the primal data feeds and processing modules.

6. The method of claim 5, wherein composing the processing graph comprises:
    generating a description of the processing goal, wherein the processing goal is represented using predicates;
    invoking a planner to generate a plan for the actions that satisfy the processing goal; and
    translating the plan into the processing graph.

7. The method of claim 1, further comprising:
    deploying the processing graph in a deployment environment; and
    displaying the output feed produced by the processing graph in the deployment environment.

8. The method of claim 7, wherein the processing graph is deployed as a web service, wherein the web service responds to requests by returning an RSS feed or an Atom feed.

9. The method of claim 1, further comprising:
    displaying the processing graph.

10. A method for automatic composition of information processing flows based on user-specified processing goals, comprising:
    receiving a processing goal, wherein the processing goal corresponds to a set of tags selected from a tag cloud;
    wherein after the processing goal is received:
    displaying the set of tags corresponding to the processing goal;
    generating a processing graph that produces an output feed with annotation containing all tags corresponding to the goal; and
    generating a next tag cloud;
    wherein after the processing graph is generated:
    generating a preview of results of the output feed and displaying the preview of results;
    displaying implied and guessed tags corresponding to the processing graph; and
    displaying a text description of the processing graph;
    wherein after the next tag cloud is generated:
    displaying the next tag cloud.

11. The method of claim 10, wherein the next tag cloud is pre-computed or dynamically computed.

12. The method of claim 10, wherein the preview of results is generated by:
    deploying the processing graph as a web service in an execution environment;
    invoking the web service to retrieve a response; and
    displaying the retrieved response from the web service as the preview of results produced by the processing graph.

13. The method of claim 10, further comprising:
    modifying the processing goal by selecting tags in the next tag cloud and repeating the steps performed after the processing goal is received.

14. A computer program product comprising a non-transitory computer useable medium having computer program logic recorded thereon for automatic composition of an information processing flow based on a user-specified processing goal, the computer program logic comprising:
    program code for receiving selected tags that specify a processing goal, wherein the tags were selected from a first plurality of tags;
    program code for composing a processing graph in accordance with the processing goal, wherein the processing graph produces an output feed with annotation containing the selected tags; and
    program code for displaying a second plurality of tags in response to the selection of the tags from the first plurality of tags,
the computer program logic further comprises:
    program code for generating a preview of results of the output feed and displaying the preview of results;
    program code for displaying implied and guessed tags corresponding to the processing graph; and
    program code for displaying a text description of the processing graph.

\* \* \* \* \*